Patented Oct. 13, 1931

1,827,295

UNITED STATES PATENT OFFICE

ARTHUR LÜTTRINGHAUS AND HUGO WOLFF, OF MANNHEIM, AND HEINRICH NERESHEIMER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE BENZANTHRONE SERIES

No Drawing. Application filed October 25, 1926, Serial No. 144,170, and in Switzerland June 17, 1926.

In the U. S. Patent No. 1,505,912, new vat dyestuffs are described which are derived from oxidized dibenzanthrone and which contain halogen as well as methoxy groups and produce on cotton brilliant green dyeings with a yellowish tinge.

We have now found that specifically those derivatives of oxidized dibenzanthrones which probably correspond to the general formula

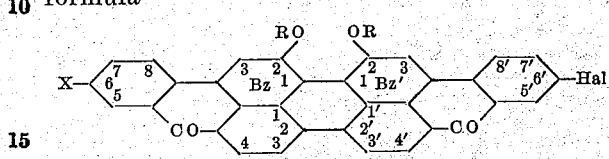

(in which Hal means a halogen atom, R indicates a hydrogen atom or an alkyl group and X means a hydrogen or halogen atom) and which are obtainable by acting on 6'-halogen—or 6.6'-dihalogen-2.2'-dibenzanthronyl with a strongly oxidizing condensing agent and, if R is an alkyl group, subsequently alkylating the reaction product, are particularly valuable. While dyeings produced with 6'-halogen or 6.6'-dihalogen-dihydroxy-dibenzanthrones are not entirely fast, the products are excellently suitable as intermediary products, whereas the derivatives of 6'-halogen—or 6.6'-dihalogen-dihydroxy-dibenzanthrones in which R is an alkyl group are remarkable for the brilliant green shades of their dyeings and their excellent fastness. The said coloring matters can be obtained for example by acting on 6'-halogen-2.2'-dibenzanthronyl or on 6.6'-dihalogen-2.2'-dibenzanthronyl with a strongly oxidizing condensing agent in the manner described in the U. S. Patent No. 1,564,423 and subsequently introducing alkyl groups into the 6'-halogen—or 6.6'-dihalogen-dihydroxy-dibenzanthrone so obtained by treating with alkylating agents such for example as dialkyl sulfates or alkyl esters of toluene sulfonic acid.

The following example will further illustrate how our invention may be carried out in practice, but the invention is not limited to this example. The parts are by weight.

A suspension of 30 parts of manganese dioxid in 150 parts of concentrated sulfuric acid is introduced into a solution of 10 parts of 6.6'-dichlor-2.2'-dibenzanthronyl in 200 parts of concentrated sulfuric acid at a temperature not higher than 10° C. in the course of an hour, while stirring. Thereupon the mixture is stirred for about 2 hours at between 6° and 8° C. and then poured into water. The oxidation product of 6.6'-dichlor-dibenzanthrone separated in the form of a reddish-brown precipitate is filtered off. It is insoluble in dilute alkalis and dissolves in concentrated sulfuric acid with a reddish brown color. By treating it with reducing agents such as sodium bisulfite and the like, its color is changed to greenish blue. The reduction product to obtained which when treated with oxidizing agents is again converted into the reddish brown substance, dissolves in hot, very dilute caustic soda lye with a yellowish green color and forms a greenish blue vat with an alkaline hydrosulfite solution.

The oxidation described above can also be effected by other oxidizing agents.

The same oxidation product as described above can also be obtained by starting from 6.6'-dichlor-dibenzanthrone and oxidizing it for example by means of manganese dioxid in concentrated sulfuric acid.

In order to introduce alkyl groups, for instance methyl radicals, 10 parts of the oxidation product described above are boiled for 3 hours under a reflux cooler with 150 parts of trichlorbenzene, 10 parts of soda ash and 10 parts of p-toluene sulfonic acid methyl ester. The mixture is allowed to cool and the precipitate then sucked off. The solid residue is freed from trichlor-benzene in the usual manner and dried. It may be purified by crystallization or by dissolving it in concentrated sulfuric acid and precipitating by means of less concentrated sulfuric acid. The vat dyestuff so obtained forms a dark bluish green powder dissolving in concentrated sulfuric acid with a reddish violet, in fuming sulfuric acid with a reddish brown color. It is insoluble in water and hot dilute alkalis. With an alkaline hydrosulfite solution it forms a blue vat, from which cotton is dyed blue shades which after washing turn into a very fast yellowish green by the oxidizing action of the air. The 6.6′-dichlor-dimethoxy-dibenzanthrone is converted into a coloring matter dyeing more bluish shades when heated for an hour to between 70° and 75° C. with about 30 times its weight of sulfuric acid of 96 per cent strength. By this property it is differentiated from the chlorination product of dimethoxy-dibenzanthrone described in the U. S. Patent 1,505,912, which when subjected to the same treatment is converted into a coloring matter dyeing more yellowish shades than the initial material.

The 6′-halogen—or 6.6′-dihalogen-2.2′-dibenzanthronyls or -dibenzanthrones may be obtained for example by condensing mixtures of 6′-halogen-benzanthrone with 2-halogen-benzanthrone or 2.6-dihalogen-benzanthrone by means of alkaline condensing agents under mild or strong conditions.

What we claim is:

1. As a new article of manufacture, 6.6′-dichlor-Bz2.Bz2′-dimethoxy-dibenzanthrone which dissolves in concentrated sulfuric acid with a reddish violet, in fuming sulfuric acid with a reddish brown color, is insoluble in water and hot dilute alkalis, forms a blue vat with an alkaline hydrosulfite solution, from which cotton is dyed very fast yellowish green shades, and which when heated for an hour to between 70° and 75° C. with about 30 times its weight of nearly concentrated sulfuric acid, is converted into a coloring matter dyeing more bluish shades.

2. A process for the production of 6.6′-dichlor-dimethoxy-dibenzanthrone which comprises acting on a solution of 6.6′-dichlor-2.2′-dibenzanthronyl in concentrated sulfuric acid with manganese dioxid and subsequently methylating the reaction product.

3. As new articles of manufacture coloring matters of the dibenzanthrone series which probably correspond to the general formula

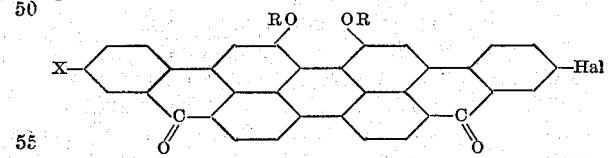

in which Hal means a halogen atom, R indicates a hydrogen atom or an alkyl group and X means a hydrogen or halogen atom.

In testimony whereof we have hereunto set our hands.

ARTHUR LÜTTRINGHAUS.
HUGO WOLFF.
HEINRICH NERESHEIMER.